United States Patent
Nishimura et al.

(10) Patent No.: US 7,201,158 B2
(45) Date of Patent: Apr. 10, 2007

(54) EXHAUST GAS RECIRCULATION CONTROL DEVICE FOR DIESEL ENGINE

(75) Inventors: Akihiro Nishimura, Osaka (JP); Michihiko Hara, Osaka (JP)

(73) Assignee: Yanmar Co., Ltd., Osaka-shi (JP)

( * ) Notice: Subject to any disclaimer, the term of this patent is extended or adjusted under 35 U.S.C. 154(b) by 0 days.

(21) Appl. No.: 10/559,618

(22) PCT Filed: May 28, 2004

(86) PCT No.: PCT/JP2004/007741

§ 371 (c)(1), (2), (4) Date: Dec. 2, 2005

(87) PCT Pub. No.: WO2004/109088

PCT Pub. Date: Dec. 16, 2004

(65) Prior Publication Data

US 2006/0144374 A1 Jul. 6, 2006

(30) Foreign Application Priority Data

Jun. 3, 2003 (JP) ............................. 2003-157841

(51) Int. Cl.
*F02M 25/07* (2006.01)
*F02B 47/08* (2006.01)
*G01M 15/00* (2006.01)
*G06F 19/00* (2006.01)

(52) U.S. Cl. ................. 123/568.16; 73/117.3; 73/118.2; 123/568.21; 701/108; 701/114

(58) Field of Classification Search .......... 123/568.11, 123/568.16, 568.21–568.28; 701/108, 114, 701/115; 73/117.3, 118.1, 118.2
See application file for complete search history.

(56) References Cited

U.S. PATENT DOCUMENTS 4,793,318 A * 12/1988 Tsurusaki .................... 701/108

(Continued)

FOREIGN PATENT DOCUMENTS

JP 55-116101 A 9/1980

(Continued)

OTHER PUBLICATIONS

International Search Report dated Sep. 14, 2004 (Five (5) Pages).

\* cited by examiner

*Primary Examiner*—Willis R. Wolfe, Jr.
(74) *Attorney, Agent, or Firm*—Crowell & Moring LLP

(57) ABSTRACT

An exhaust gas recirculation control device in a diesel engine, capable of suppressing NOx and smoke discharged. A first temperature sensor (11) is provided at a portion more on the upstream side than a portion where a suction air path (3) joins an exhaust gas recirculation path (4), and a second temperature sensor (12) is provided on the downstream side. Further, an engine load detection sensor (6) and an engine speed detection sensor (7) are arranged. The exhaust gas recirculation control device also has memory means where the temperature of suction air before it is mixed with an exhaust gas and a temperature value at a second temperature sensor installation position are previously memorized, the temperature value corresponding to an appropriate exhaust gas recirculation amount that is uniquely defined by an engine load and an engine speed. Further, judging means is provided. The judging means compares the corresponding temperature value memorized in the memory means and a value detected by the second temperature sensor. When the detected value is within a predetermined range relative to the temperature value, a circulation exhaust gas amount is determined to be appropriate, and when the detected value is not within a predetermined range relative to the temperature value, a circulation exhaust gas amount is determined to be abnormal.

12 Claims, 5 Drawing Sheets

U.S. PATENT DOCUMENTS

| | | | |
|---|---|---|---|
| 5,014,203 A * | 5/1991 | Miyazaki et al. | 701/108 |
| 6,581,372 B2 * | 6/2003 | Sasaki et al. | 123/568.11 |
| 6,647,972 B2 * | 11/2003 | Sato et al. | 123/568.16 |
| 6,687,601 B2 * | 2/2004 | Bale et al. | 701/108 |
| 6,708,676 B2 * | 3/2004 | Akao et al. | 123/568.16 |
| 2002/0038654 A1 * | 4/2002 | Sasaki et al. | 123/568.11 |

FOREIGN PATENT DOCUMENTS

| | | |
|---|---|---|
| JP | 58-197461 A | 11/1983 |
| JP | 62-162761 A | 7/1987 |
| JP | 63-038678 A | 2/1988 |
| JP | 63-134844 A | 6/1988 |
| JP | 63-259148 A | 10/1988 |
| JP | 2002-256982 A | 9/2002 |

# EXHAUST GAS RECIRCULATION CONTROL DEVICE FOR DIESEL ENGINE

TECHNICAL FIELD

The present invention relates to an exhaust gas recirculation type diesel engine which can suppress discharge of smoke and NOx.

BACKGROUND ART (Prior Art)

In an operation environment surrounding a diesel engine, a regulation is becoming severe in recent years, and it is desired to provide a diesel engine having a performance which can satisfy the regulation. Japanese Unexamined Patent Publication No. 63-134844 describes an exhaust gas recirculation type internal combustion engine. In this publication, in order to avoid an increase of an NOx discharging amount caused by a reduction of an EGR gas amount, there is disclosed a technique of controlling so as to secure a predetermined amount or more of EGR gas. The invention described in No. 63-134844 relates to the internal combustion engine in which a throttle valve is necessarily provided as a constituting element, as described in claim 1 of No. 63-134844. In other words, although No. 63-134844 describes the internal combustion engine, the embodiment is described by exemplifying a gasoline engine, and the throttle valve is described in FIG. 1. Accordingly, it is apparent that the diesel engine is not included in the internal combustion engine expressed in the invention of No. 63-134844.

No smoke (no soot) is discharged from the gasoline engine disclosed in the publication mentioned above, and it is basically sufficient to take a structure for preventing NOx from being discharged into consideration. On the contrary, in the diesel engine, if an EGR gas amount is increased, an NOx amount is reduced, but a discharge amount of the smoke is increased. Accordingly, in the diesel engine, it is impossible to uphold a control standard for the exhaust gas even by applying the invention described in the patent document 1.

In the exhaust gas recirculation type diesel engine, at a time of controlling the EGR gas amount, it is necessary to regulate within a range which can simultaneously suppress both the NOx amount and the smoke amount discharged.

DISCLOSURE OF INVENTION (Problems to be Solved by the Invention)

Accordingly, an object of the present invention is to provide an exhaust gas recirculation control device for a diesel engine which can simultaneously suppress both of discharged NOx and smoke by controlling such that a rate of EGR becomes within a predetermined range.

(Means for Solving the Problems)

In order to solve the problems mentioned above, in accordance with a first aspect of the present invention, an exhaust gas recirculation control device in a diesel engine provided with an exhaust gas recirculation path communicating a suction air path with an exhaust gas path, includes: a first temperature sensor provided at a portion more on the upstream side than a portion where the suction air path joins the exhaust gas recirculation path; a second temperature sensor provided at a portion more on the downstream side than a portion where the suction air path joins the exhaust gas recirculation path; an engine load detection sensor; an engine speed detection sensor; a memory means storing, in advance, a temperature of a suction air before being mixed with an exhaust gas, and a temperature value at the second temperature sensor installation position corresponding to an appropriate exhaust gas recirculation amount which is uniquely defined by an engine load and an engine speed; and a judging means comparing the temperature value stored in the memory means corresponding to the detected values detected from the engine load detection sensor, the engine speed detection sensor and the first temperature sensor, with the detection value detected by the second temperature sensor, determining that the recirculation exhaust gas amount is appropriate in the case that the detection value is within a predetermined range relative to the temperature value, and determining that the recirculation exhaust gas amount is abnormal in the case that the detection value is not within the predetermined range relative to the temperature value.

In accordance with a second aspect of the present invention, the structure is made in the invention as recited in the first aspect such that a throttle valve capable of regulating a flow rate of the exhaust gas passing through the exhaust gas recirculation path is provided in the exhaust gas recirculation path, a control means for controlling an opening degree of the throttle valve is provided, and an opening degree of the throttle valve is controlled by the control means, whereby the temperature value at the portion more on the downstream side than the portion where the suction air path communicates with the exhaust gas recirculation path corresponding to the temperature value at the portion more on the upstream side than the portion where the suction air path communicates with the exhaust gas recirculation path is within a previously set predetermined range.

In accordance with a third aspect of the present invention, the structure is made in the invention as recited in the first or second aspect such that a response delay of the detection value by the second temperature sensor is compensated by averaging the temperature value stored in the memory means corresponding to the detection values detected from the engine load detection sensor in a temporal manner, the engine speed detection sensor and the first temperature sensor.

In accordance with a fourth aspect of the present invention, the structure is made in the invention as recited in the first or second aspect such that in the diesel engine in which an operation of rapidly changing an engine load or an engine speed is executed, the judging means executes a judgment of the amount of the recirculation exhaust gas only at a time when the engine load and the engine speed are stabilized.

In accordance with a fifth aspect of the present invention, the structure is made in the invention as recited in the first or second aspect such that a cooling water temperature sensor detecting a temperature of a cooling water is provided, a detecting means detecting that a warm-up is finished on the basis of a fact that the temperature of the cooling water detected by the cooling water temperature sensor reaches a predetermined temperature is provided, and the judgment of the amount of the recirculation exhaust gas is executed by the judging means at either a time after the warm-up is finished and before an actual operation is started, or a time after the actual operation is finished and the engine stops.

In accordance with a sixth aspect of the present invention, the structure is made in the invention as recited in the first aspect such that when the judging means determines that the amount of the recirculation exhaust gas is abnormal in the case that the detection value does not exist within the predetermined range, by comparing the temperature value stored in the memory means corresponding to the detection value detected from the engine load detection sensor, the engine speed detection sensor and the first temperature sensor with the detection value detected by the second temperature sensor, a margin in the predetermined range is set smaller in a side in which the detection value of the second temperature sensor is higher than in a side in which the detection value is lower.

In accordance with a seventh aspect of the present invention, the structure is made in the invention as recited in any one of the first to third aspect such that a compensating means for compensating the temperature value stored in the memory means by the temperature value detected by the cooling water temperature sensor at a time of a cooling condition is provided.

(More Effective Advantages than Prior Art)

In accordance with the first aspect of the present invention, since an engine load detection sensor 6 and an engine speed detection sensor 7 is provided for comprehending an operation condition of a diesel engine 100, a memory means previously storing a downstream temperature corresponding to an appropriate exhaust gas recirculation amount which is uniquely defined by an upstream temperature $T_1$, an engine load and an engine speed is provided, a first temperature sensor 11 detecting the upstream temperature $T_1$ and a second temperature sensor 12 detecting a downstream temperature $T_2$ are further provided, and a judging means 13 for determining whether or not a temperature difference between the both is within a predetermined range by comparing a temperature value corresponding to an operation condition stored in the memory means with the downstream temperature $T_2$ detected by the second temperature sensor 12 is provided, it is possible to judge whether or not an EGR rate of the diesel engine 100 is normal. Accordingly, it is possible to suppress the discharge of both the NOx and the smoke until the abnormality is detected. When the abnormality is detected, it is possible to seize an opportunity for devising a countermeasure by stopping the operation or generating an alarm.

It is possible to recognize a fluctuation of the EGR rate on the basis of a clogging of a suction air filter 10 or a clogging of a muffler 15, by carrying out the first aspect of the present invention, whereby it is possible to appropriately determine a timing for executing a maintenance.

In accordance with the second aspect of the present invention, it is possible to control the EGR rate in such a manner as to suppress a discharge amount of the smoke and the NOx, by arranging an EGR valve 5 in an exhaust gas recirculation path 4, and regulating an opening degree of the EGR valve 5 so as to control a downstream temperature $T_2$ within an appropriate range.

In accordance with the third aspect of the present invention, it is possible to avoid an erroneous judgment of a judging device 13 by executing a judgment using a temporal average while taking a delay of detection of the second temperature sensor 12 into consideration, the combustion fluctuation of the diesel engine 100 becomes small, and it is possible to well suppress a discharge amount of the smoke and the NOx.

In accordance with the fourth aspect of the present invention, since the amount of the recirculation exhaust gas is judged only at a time when the engine load and the engine speed are stabilized, in the diesel engine 100 in which the operation rapidly changing the engine load or the engine speed is executed, it is possible to avoid the combustion fluctuation at a time of the normal operation of the diesel engine 100.

In accordance with the fifth aspect of the present invention, since the judgment by the judging device 13 is executed after the warm-up of the diesel engine 100 is sufficiently executed, by detecting that the warm-up is finished on the basis of the fact that the cooling water temperature reaches the predetermined temperature by means of the cooling water temperature sensor 14 detecting the temperature of the cooling water, it is possible to avoid the judging work at a time of the cooling condition in which the appropriate judgment is hard to be executed, and it is possible to avoid the combustion fluctuation.

In accordance with the sixth aspect of the present invention, it is possible to well suppress the discharge of the smoke by setting a margin of the predetermined range smaller in the side in which the detection value of the second temperature sensor 12 becomes higher than in the side in which the detection value becomes lower, at a time when the judging device 13 determines that the amount of the EGR gas is abnormal in the case that the detection value detected by the second temperature sensor 12 does not exist within the predetermined range from the temperature value on the map stored in the memory 19.

In accordance with the seventh aspect of the present invention, since a compensation means for compensating the temperature value stored in the memory 19 (the memory means) on the basis of the temperature value detected by the cooling water temperature sensor 14 at a time of the cooling condition is provided, it is possible to secure the appropriate EGR rate even at a time of the cooling condition, and it is possible to reduce the discharge amount of the smoke and the NOx.

DESCRIPTION OF THE PREFERRED EMBODIMENT

Figure 1:
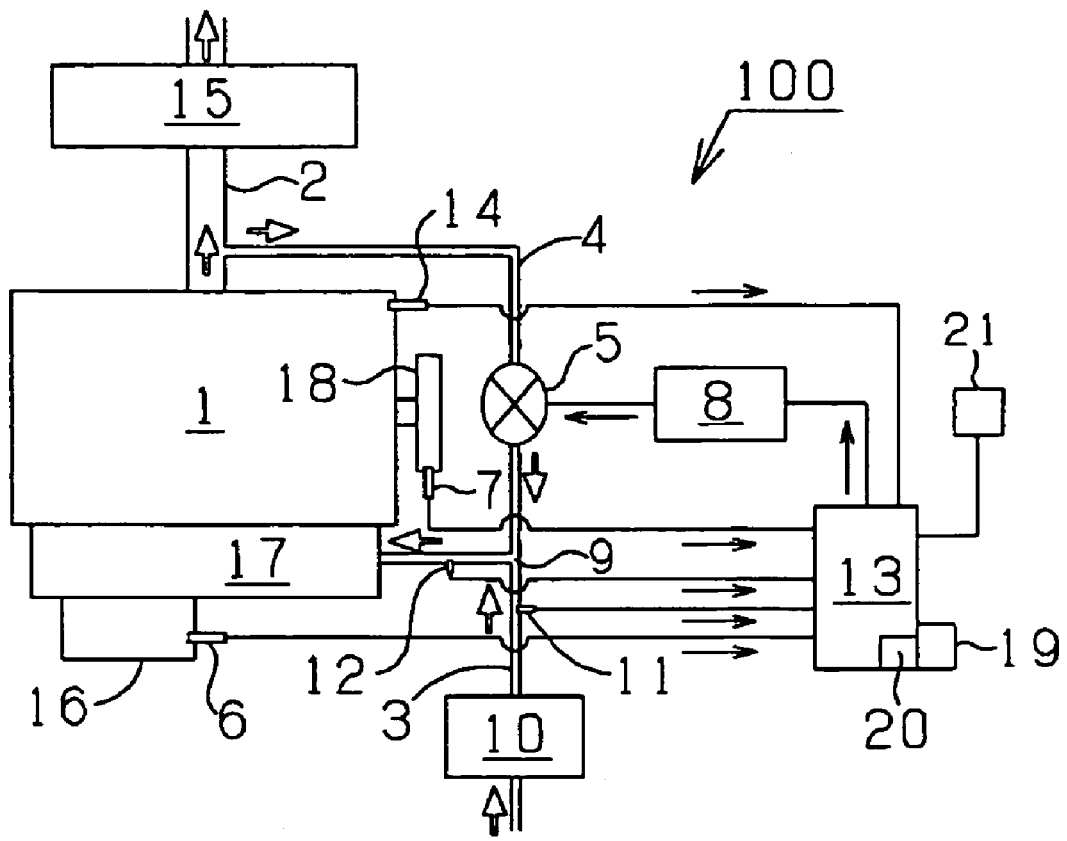
FIG. 1 is a schematic view of a system of a diesel engine obtained by carrying out the present invention.

FIG. 1 is a schematic view of a system of a diesel engine 100 obtained by carrying out the present invention (each of the inventions on the basis of the first to seventh aspects). The diesel engine 100 is provided with a suction air path 3 having a suction air filter 10 in the middle and supplying an air to a combustion chamber 17 within an engine main body 1, and an exhaust gas path 2 discharging an exhaust gas after combustion. A muffler 15 is provided in the exhaust gas path 2.

As shown in FIG. 1, one end of an exhaust gas recirculation path 4 is connected to the middle of the exhaust gas path 2, and the other end of the exhaust gas recirculation path 4 is connected to the suction air path 3 in a joint portion 9. An electromagnetic control type EGR valve 5 (a throttle valve) is provided in the exhaust gas recirculation path 4. An amount of exhaust gas (EGR gas) mixed with an air in the joint portion 9 can be regulated by changing an opening degree of the EGR valve 5.

Further, a fuel injection pump 16 supplying a fuel to the combustion chamber 17 is provided in the diesel engine 100. An engine load detection sensor 6 is provided in the fuel injection pump 16. An engine speed detection sensor 7 is provided in a flywheel 18. Further, a cooling water temperature detection sensor 14 is provided in the engine main body 1. The engine load detection sensor 6, the engine speed detection sensor 7 and the cooling water temperature detection sensor 14 are respectively connected by wiring to a judging device 13 which is in detail described below.

As shown in FIG. 1, a first temperature sensor 11 is provided between the suction air filter 10 of the suction air path 3 and the joint portion 9. Further, a second temperature sensor 12 is provided in a downstream side of the joint portion 9 of the suction air path 3.

Respective detection signals detected by the first temperature sensor 11, the second temperature sensor 12, the engine load detection sensor 6, the engine speed detection sensor 7 and the cooling water temperature detection sensor 14 are respectively transmitted to the judging device 13 via wiring. The judging device 13 outputs a command to an EGR control device 8 on the basis of the respective input detection signals, and the EGR control device 8 appropriately regulates an opening degree of the EGR valve 5.

The judging device 13 is provided with a CPU 20 and a memory 19 (a memory means). An appropriate value of a temperature (hereinafter, refer to as a downstream temperature) of an appropriate mixed air (a suction air containing an EGR gas) within the suction air path 3 (an installation position of the second temperature sensor 12) in a downstream side from the joint portion 9 corresponding to a combination of the engine load, the engine speed and a suction air temperature (hereinafter, refer to as an upstream temperature) between the suction air filter 10 and the joint portion 9 (in an installation position of the first temperature sensor 11) is previously determined on the basis of an experiment. This is stored as a map in the memory 19. The CPU 20 executes various arithmetic operations and judgments mentioned below. The exhaust gas recirculation control device for the diesel engine 100 is structured as mentioned above.

Figure 2:
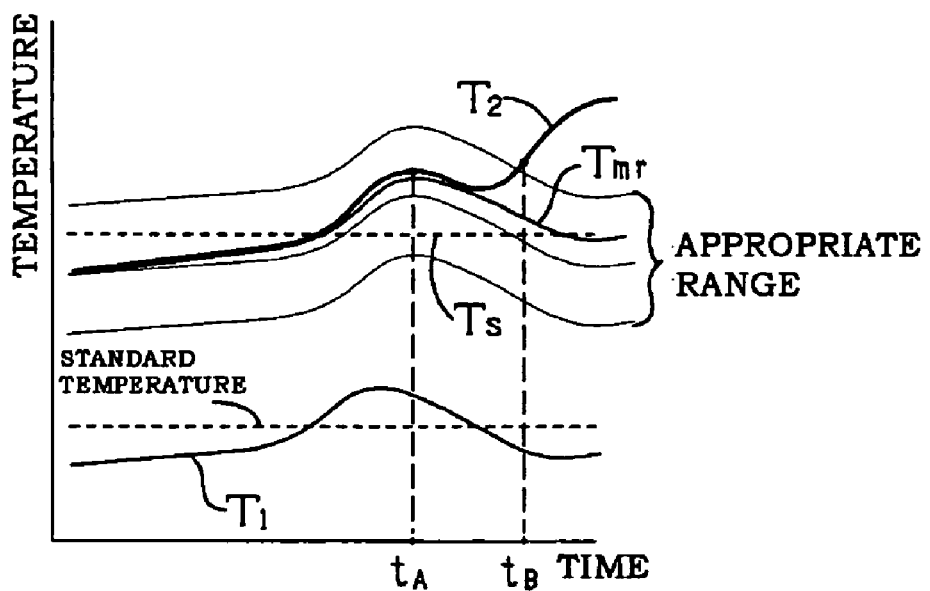
FIG. 2 is a graph which compares an example of an appropriate value (a standard mixed gas temperature Ts) of a downstream temperature $T_2$ changing in correspondence to a change of an engine load and an engine speed, with an upstream temperature $T_1$.

FIG. 2 is a graph comparing one example of an appropriate value (a standard mixed gas temperature Ts: mentioned below) of a downstream temperature $T_2$ changing in correspondence to the change of the engine load and the engine speed, with an upstream temperature $T_1$. The standard mixed gas temperature Ts is uniquely defined on the basis of the combination of the engine load and the engine speed mentioned above, as far as the diesel engine 100 is normal.

In FIG. 2, the suction air temperature after being mixed, which is uniquely defined on the basis of the engine load and the engine speed in the standard condition is hereinafter called as the standard mixed gas temperature Ts. A target value of the downstream temperature obtained by compensating the standard mixed gas temperature Ts by the upstream temperature $T_1$ detected by the first temperature sensor 11 is called as a compensated mixed gas temperature Tmr. Further, the suction air temperature within the suction air path 3 in the upstream side from the joint portion 9 in FIG. 1 is called as the upstream temperature $T_1$, and the suction air temperature within the suction air path 3 in the downstream side from the joint portion 9 is called as the downstream temperature $T_2$.

(Embodiment of the Invention of Claim 1)

In the case that the diesel engine 100 is started, and the engine load and the engine speed do not rapidly change (for example, at an idling time after a warm-up is finished), the judging device 13 compares the suction air temperature $T_1$ before being mixed with the exhaust gas (the EGR gas) detected by the first temperature sensor 11, the temperature range on the map stored in the memory 19 corresponding to the combination of the engine load and the engine speed respectively detected by the engine load detection sensor 6 and the engine speed detection sensor 7, and the actual downstream temperature $T_2$ detected by the second temperature sensor 12. At this time, in the target value of the downstream temperature, it is preferable to compensate the compensated mixed gas temperature Tmr by the upstream temperature $T_1$ (compensate the compensated mixed gas temperature Tmr higher in accordance that the upstream temperature $T_1$ becomes higher and inversely compensate the compensated mixed gas temperature Tmr lower in accordance that the upstream temperature $T_1$ becomes lower), and compare the compensated mixed gas temperature Tmr after the compensation with the downstream temperature $T_2$.

If the downstream temperature $T_2$ is within the temperature range on the map, the judging device 13 judges that the EGR gas amount is appropriate. On the contrary, in the case that the downstream temperature $T_2$ is smaller than the temperature range on the map, the judging device 13 judges that the EGR gas amount comes short, and in the case that the downstream temperature $T_2$ is larger than the temperature range on the map, the judging device 13 judges that the EGR gas amount is excess. At this time, it is possible to inform an operator of an abnormality by lighting an alarm lamp or sounding a buzzer. Further, at this time, the diesel engine 100 may be stopped in some intended use of the diesel engine 100.

(Embodiment of the Invention of Claim 2)

In the embodiment in accordance with the invention on the basis of the first aspect, in the case that the judging device 13 judges that the EGR gas amount is small (the EGR rate is low), the judging device 13 outputs a command to the EGR control valve 8 so as to increase the opening degree of the EGR valve 5 (so as to make the EGR rate high) in such a manner that the EGR gas amount becomes appropriate.

On the contrary, in the case that the judging device 13 judges that the EGR gas amount is large (the EGR rate is high), the judging device 13 outputs a command to the EGR control valve 8 so as to reduce the opening degree of the EGR valve 5 (so as to make the EGR rate low) in such a manner that the EGR gas amount becomes appropriate. The opening degree of the EGR valve is regulated in the manner mentioned above, and the EGR gas amount becomes appropriate.

The EGR rate is uniquely defined by the engine load and the engine speed, however, the downstream temperature is uniquely determined by taking into consideration the upstream temperature $T_1$ detected by the first temperature sensor 11 in addition thereto. Further, if the upstream temperature $T_1$ is increased, the exhaust gas temperature (the EGR gas temperature) is increased, so that the downstream temperature $T_2$ detected by the second temperature sensor 12 is increased.

Accordingly, it is necessary to compensate the downstream temperature (the standard mixed gas temperature Ts) in the normal state which is compared with the downstream temperature $T_2$ detected by the second temperature sensor 12, for example, in accordance with the following equation (1). It is possible to secure an appropriate EGR rate on the basis of the equation (1).

$$Tmr=Ts+(T_1-T_0)/293 \times Tex \times EGR \quad (1)$$

where Tmr is compensation mixed gas temperature, Ts is standard mixed gas temperature, $T_1$ is upstream temperature, $T_0$ is standard suction air temperature (K), Tex is standard exhaust gas temperature (K), and EGR is EGR rate.

If the upstream temperature $T_1$ changes as shown in FIG. 2, the downstream temperature $T_2$ also changes following thereto. While the upstream temperature $T_1$ displaces near the standard temperature, the downstream temperature $T_2$ deflects from the allowable range due to various reasons.

As shown in FIG. 2, the downstream temperature $T_2$ at a time $t_A$ is affected by the suction air temperature $T_1$, and deviates from the allowable range on the basis of the standard mixed gas temperature Ts. On the contrary, the downstream temperature $T_2$ at the time $t_A$ exists within the appropriate range on the basis of the compensated mixed gas temperature Tmr compensated by the suction air temperature $T_1$ and is not abnormal. Thereafter, when running into a time $t_B$, the EGR gas amount is increased (the EGR rate is increased) on the basis of the clogging of the filter or the clogging of the muffler, the downstream temperature $T_2$ at the time $t_B$ deviates from the appropriate range on the basis of the compensated mixed gas temperature Tmr, and the judging device 13 determines that the downstream temperature $T_2$ at the time $t_B$ is abnormal.

The standard mixed gas temperature Ts is previously determined by an experiment, however, the standard mixed gas temperature Ts is uniquely defined on the basis of the engine load and the engine speed. Further, the standard mixed gas temperature Ts changes following to the change of the suction air temperature (the upstream temperature $T_1$). This relation is previously stored as the equation (1) mentioned above in the memory 19.

If the upstream temperature $T_1$ is changed, the downstream temperature $T_2$ actually measured in the case that the EGR gas amount is normal undergoes a transition within a region (an appropriate range) sandwiched by two narrow lines. On the contrary, if the downstream temperature $T_2$ deviates from the range between two narrow lines, it is possible to determine that the EGR gas amount is abnormal.

Figure 3:
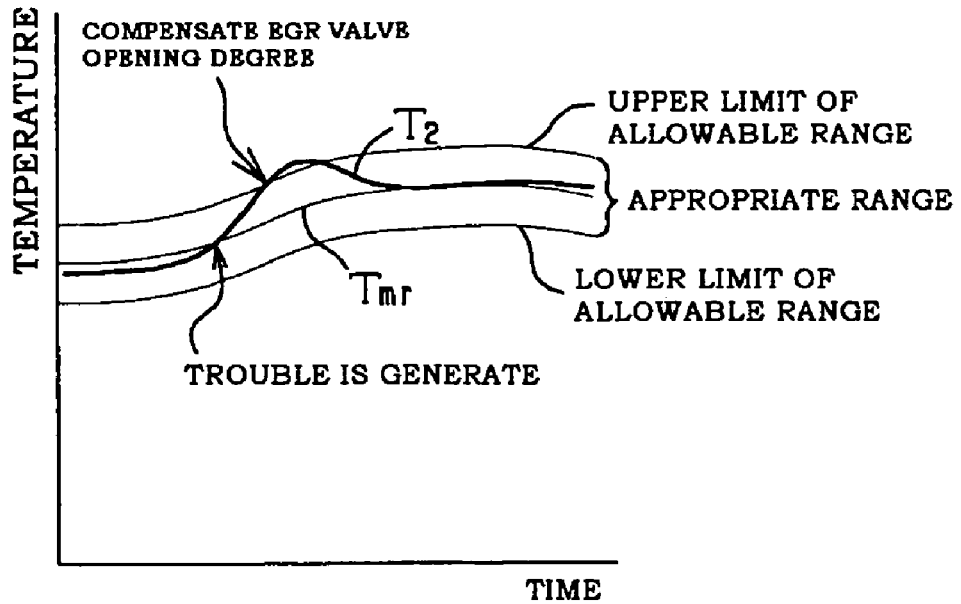
FIG. 3 is a graph which compares a change of the downstream temperature $T_2$ actually measured by a second temperature sensor, with a compensated mixed gas temperature Tmr corresponding to an appropriate value of the downstream temperature on a map.

FIG. 3 is a graph comparing the change of the downstream temperature $T_2$ actually measured by the second temperature sensor 12, with the compensated mixed gas temperature Tmr corresponding to the appropriate value of the downstream temperature on the map. In FIG. 3, an upper limit and a lower limit of the appropriate range of the downstream temperature are set around the compensated mixed gas temperature Tmr. If any trouble is generated and the downstream temperature $T_2$ deviates from the appropriate range, the judging device 13 compensates the opening degree of the EGR valve 5 so as to make the downstream temperature $T_2$ be within the appropriate range.

Figure 4:
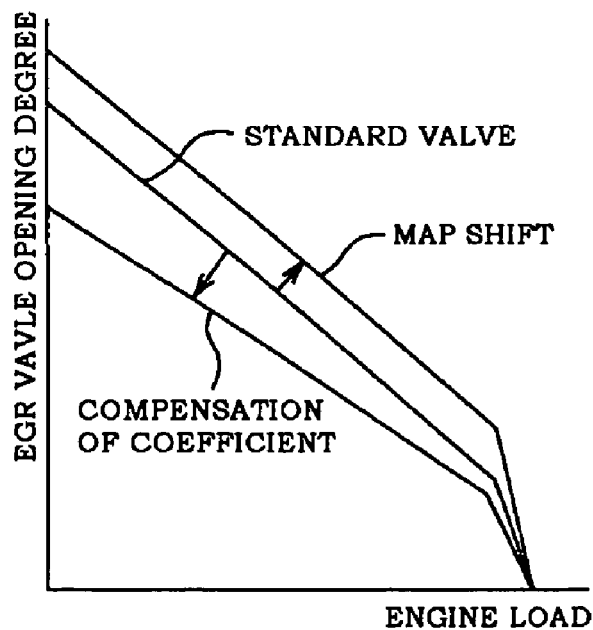
FIG. 4 is a graph showing a relation between an opening degree of an EGR valve and the engine load.

FIG. 4 is a graph showing a relation between the opening degree of the EGR valve 5 and the engine load. In the case that the downstream temperature $T_2$ deviates from the appropriate range, it is effective to shift the map itself from the standard value as shown in FIG. 4, for example, in accordance with the equation (1). Further, it is possible to compensate by changing a slope (a coefficient) of the graph.

In the case that the opening degree of the EGR valve 5 is not normal, a map shift corresponding to a fixed amount compensation of the opening degree is effective. With respect to a change of a pressure difference caused by the clogging of the suction air filter 10 and the muffler 15, it is effective to change a slope of a straight line of the graph.

(Embodiment of the Invention of Claim 3)

Since the temperature sensor has a calorific capacity by itself, a response delay is generated. The invention in accordance with the third aspect of the present invention copes with the response delay of the second temperature sensor 12 at a time of carrying out the inventions in accordance with the first and second aspects.

In the case that the downstream temperature $T_2$ detected by the second temperature sensor 12 temporarily has a large difference from the compensated mixed gas temperature Tmr because the downstream temperature can not follow the rapid change of the engine load and the engine speed, the judging device 13 outputs a command of compensating the opening map of the EGR valve 5 to the EGR control device 8 in each case, and there is a risk that the combustion becomes unstable. In other words, if the judging device 13 faithfully judges on the basis of the detection signal of the second temperature sensor 12, the signal indicating that the EGR gas amount is abnormal is input to the state in which the appropriate EGR gas amount has been actually established, the opening degree of the EGR valve 5 is changed, and there is further considered that the combustion is deteriorated so as to discharge the smoke and the NOx.

In order to avoid the matter mentioned above and stabilize the combustion, it is preferable to employ a forward moving average method described below. The forward moving average method is a method of obtaining a calculated value A5 by substituting, for example, past four time values (calculated values) A1 to A4 of the detection value detected by the engine load detection sensor 6 and the engine speed detection sensor 7, and this time actually measured value B5 for an equation (2), and employing the calculated value A5 in place of the actually measured value B5.

$$A5=(A1+A2+A3+A4+B5)/5 \quad (2)$$

In the same manner, a value A6 is calculated by the following equation (3).

$$A6=(A2+A3+A4+A5+B6)/5 \quad (3)$$

In the calculated values A1 to AX calculated in the manner mentioned above, a fluctuation band becomes small in comparison with the actually measured values B1 to BX. In addition, if the calculated values A1 to AX having the small fluctuation band are employed as the signal judged by the judging device 13 in place of the actually measured values B1 to BX, the combustion of the diesel engine 100 becomes stable. Even if the actually measured values B1 to BX deviate from the appropriate range, the calculated values A1 to AX exist within the appropriate range, and it is possible to well reduce the discharge of the NOx and the smoke simultaneously.

Figure 5:
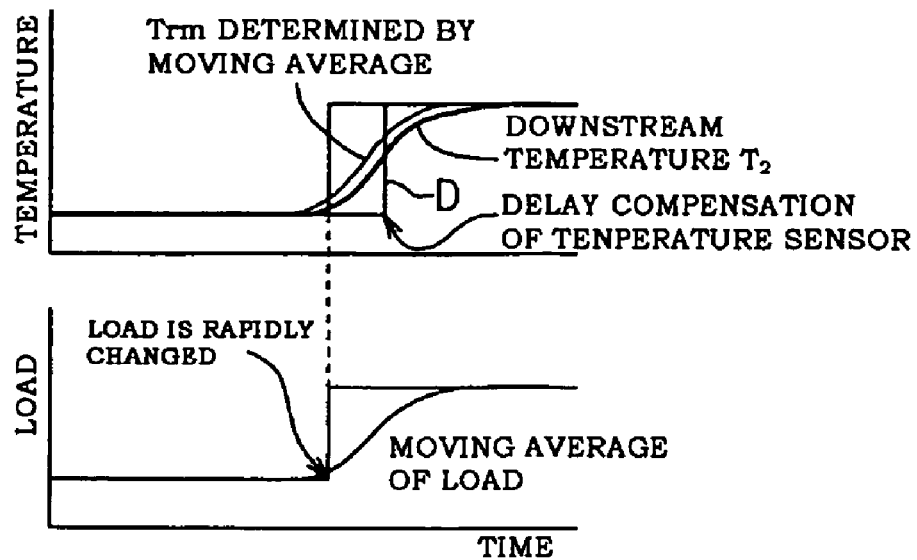
FIG. 5 is a graph showing a change of the downstream temperature $T_2$ relative to a load fluctuation.

FIG. 5 is a graph showing a change of the downstream temperature $T_2$ with respect to the load change. Since the second temperature sensor 12 itself has a calorific capacity, the output value (the downstream temperature $T_2$) of the second temperature sensor 12 follows gradually behind time as shown in FIG. 5, in the case that the engine load is rapidly changed (the same matter is applied in the engine speed).

A problem caused by the matter that the actual EGR gas amount and the temperature detection by the second temperature sensor 12 do not correspond at real time can be solved by calculating the compensated mixed gas temperature Tmr on the basis of the engine speed detection signal and the engine load detection signal in which the fluctuation band is suppressed by the forward moving average method mentioned above. In addition, it is possible to solve the problem caused by the response delay by averaging the compensated mixed gas temperature Tmr calculated by using the engine load detection signal and the engine speed detection signal input to the judging device 13, and suppressing the fluctuation band.

Further, in some operation aspect of the diesel engine 100, there is achieved an effect of stabilizing the combustion even if the operation of the EGR valve 5 is slowly executed. Further, on the assumption that the output of the second temperature sensor 12 always gets behind the output of the engine load detection signal and the engine speed detection signal (for example, for one second), it is possible to make the difference between the actual temperature and the detected temperature only by delaying at a predetermined time (for example, one second) as shown by reference symbol D in FIG. 5.

(Embodiment of the Invention of Claim 4)

If the suction air filter 10 is clogged or the foreign material is clogged in the muffler 15, a mixing rate between the air and the EGR gas (an EGR rate) is changed even if the opening degree of the EGR valve 5 is appropriate. Accordingly, there is a case that whether or not the suction air filter 10 and the muffler 15 are in a clean state adversely affects the combustion of the diesel engine 100.

Further, since the deterioration of the suction air filter 10 and the muffler 15 makes progress slowly, it is not necessary to always monitor. In the case mentioned above, the judgment by the judging device 13 is executed at a time when the combustion is comparatively stable such as an idle operation time or the like. In particular, in the diesel engine for the motor vehicle, the operation state tends to be rapidly changed (changed in load).

Accordingly, the judgment is not executed at a time of a normal operation, but is executed only at a time when the combustion is stable. In accordance with the structure mentioned above, the downstream temperature $T_2$ (the EGR gas amount) does not deviate largely from the appropriate range even at a time of the normal operation, and it is possible to reduce the discharge of the NOx and the smoke even in the diesel engine 100 for an intended use in which the load change and the rotational change are large.

Figure 6:
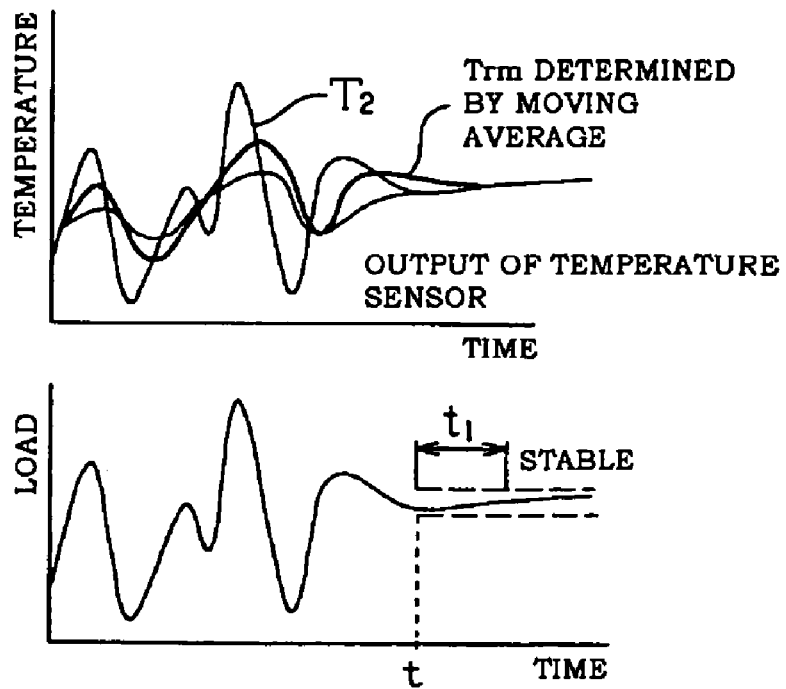
FIG. 6 is a graph comparing the fluctuation of the engine load with the downstream temperature.

FIG. 6 is a graph comparing the change of the engine load with the downstream temperature. In FIG. 6, the load change becomes smaller after a time t. Accordingly, the detection is executed by each of the sensors from the time t to the time t1, and the judgment by the judging device 13 is executed on the basis thereof.

(Embodiment of the Invention of Claim 5)

In the cooling condition (when the engine temperature during the warm-up or the like is low), it is hard that each of the sensors executes a normal detection. If the opening degree, for example, of the EGR valve 5 is changed at that time, it is unavoidable to deviate from the appropriate value. Accordingly, the judgment by the judging device 13 is executed at a timing when the combustion is stabilized except the cooling condition as mentioned below.

The judging device 13 is provided with a function of detecting the end of the warm-up, and recognizes that the diesel engine 100 finishes the warm-up on the basis of the signal input from the cooling water temperature sensor 14. If the judging device 13 recognizes that the warm-up is finished, the judging device 13 receives the detection signal from each of the sensors before starting the normal operation so as to judge whether or not the EGR gas amount is appropriate.

In the embodiment mentioned above, there is shown the embodiment that the judgment is executed at a time of the idle operation just after the warm-up is finished, however, the structure may be made such that the judgment is executed before stopping the diesel engine 100 after the operation of the diesel engine 100 is finished.

(Embodiment of the Invention of Claim 6)

Figure 7:
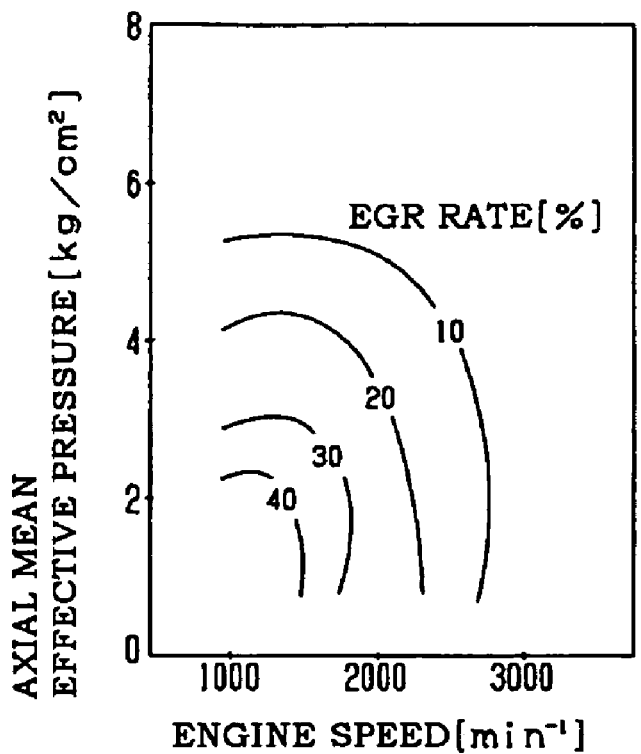
FIG. 7 is a graph showing a relation between an axial mean effective pressure and an engine speed per the different EGR rate.
Figure 8:
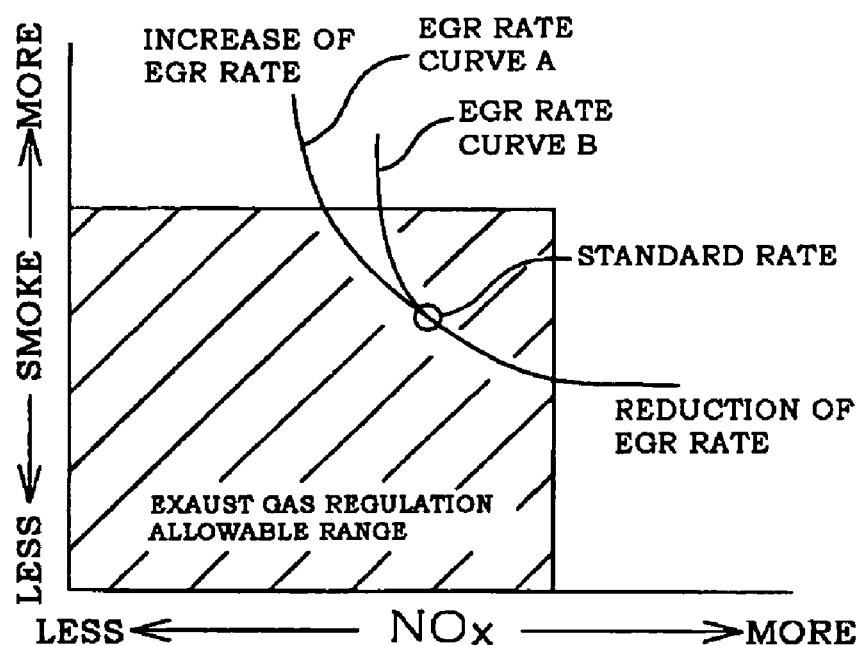
FIG. 8 is a graph showing a relation between an exhaust gas regulation allowable range limited by an allowable smoke amount and an allowable NOx amount contained in the exhaust gas, and an EGR rate of the diesel engine.

FIG. 7 is a graph showing a relation between the axial mean effective pressure and the engine speed per the different EGR rate. Further, FIG. 8 is a graph showing a relation between an exhaust gas regulation allowable range limited by the allowable smoke amount and the allowable NOx amount contained in the exhaust gas, and the EGR rate of the diesel engine 100.

In the case that the compensated mixed gas temperature Tmr on the map stored in the memory 19 corresponding to the engine load, the engine speed and the upstream temperature $T_1$ detected by the engine load detection sensor 6, the engine speed detection sensor 7 and the first temperature sensor 11 deviate from the actual downstream temperature $T_2$ detected by the second temperature sensor 12 at a predetermined temperature (for example, 30° C.) or more, an abnormality is aroused in the diesel engine 100 by lighting an alarm lamp or sounding an alarm buzzer.

Since the high-temperature EGR gas amount is increased in accordance with the increase of the EGR rate, the suction air temperature becomes higher. Further, as shown in FIG. 8, the discharge amount of the smoke is increased in accordance with the increase of the EGR rate.

In the case that the EGR gas amount is increased on the basis of an erroneous operation (an excessive opening) of the EGR valve 5, the EGR rate undergoes a transition within the exhaust gas regulation allowable range region (a hatched region in FIG. 8) along the EGR curve A. On the contrary, there is a case that the EGR rate is increased because the pressure balance between the air pressure and the EGR gas pressure is unbalanced due to the clogging of the suction air filter 10 and the muffler 15. At this time, the suction air amount of the diesel engine 100 itself is reduced, so that an oxygenless state is generated. At this time, the EGR rate undergoes a transition along the EGR curve B, and deviates from the exhaust gas allowable range region earlier than the EGR curve A, and the smoke is rapidly deteriorated.

Accordingly, it is necessary to make a judging level (margin) severe in the side in which the EGR rate is increased, that is, the side in which the downstream temperature $T_2$ is higher than the standard mixed gas temperature Tmr. A degree of severity is changed in accordance with the engine load, however, it is preferable to set to about 50% of the EGR rate reduction side in the operation region having the high engine load (about 50% to 100% of a rated engine load), and set to about 80% of the EGR rate reduction side in the operation region having the low engine load (about 50% or less of the rated engine load).

For example, in the operation region having the high engine load, in the case that the EGR abnormality is judged if the downstream temperature $T_2$ actually measured by the second temperature sensor 12 is lower by 30° C. or more than the compensated mixed gas temperature Tmr on the map in the EGR rate reduction side (the side where the EGR gas amount is short), it is set such that if the downstream temperature $T_2$ actually measured by the second temperature sensor 12 becomes higher by 15° C. or more than the compensated mixed gas temperature Tmr on the map in the EGR rate increase side (the EGR gas amount excess side), the judging device 13 judges the EGR abnormality.

On the contrary, in the operation region having the low engine load, in the case that the EGR abnormality is judged if the downstream temperature $T_2$ actually measured by the second temperature sensor 12 is lower by 30° C. or more than the compensated mixed gas temperature Tmr on the map in the EGR rate reduction side, it is set such that if the downstream temperature $T_2$ actually measured by the second temperature sensor 12 becomes higher by 24° C. or more than the compensated mixed gas temperature Tmr on the map in the EGR rate increase side, the judging device 13 judges the EGR abnormality.

In the case that the downstream temperature $T_2$ deviates from the standard mixed gas temperature Ts at the predetermined temperature or more as mentioned above, the judging device 13 judges that an abnormal state is generated, and takes a measure, for example, of generating an alarm, stopping the diesel engine 100. As a result, it is possible to suppress the discharge of both the smoke and the NOx.

(Embodiment of the Invention of Claim 7)

Figure 9:
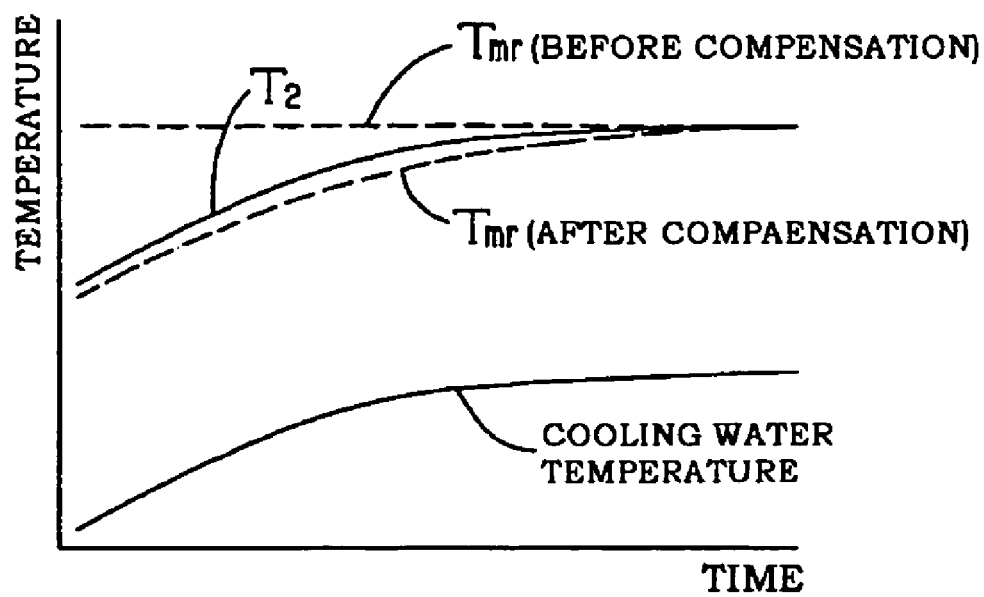
FIG. 9 is a graph further compensating the compensated mixed gas temperature Tmr while taking a cooling water temperature into consideration.

FIG. 9 is a graph further compensating the compensated mixed gas temperature Tmr while taking the cooling water temperature into consideration. Taking the cooling water temperature into consideration in the equation (1) mentioned above, an equation (4) (a compensating means) is obtained.

$$Tmr=Ts+(T_1-T_0)\times\{Tex-a1\times(Tw_0-Tw)\}\times EGR/293 \quad (4)$$

where $T_0$ is standard suction air temperature (K), Tex is standard exhaust gas temperature (K), $Tw_0$ is standard cooling water temperature, Tw is current cooling water temperature, and a1 is influence coefficient of cooling water temperature (for example, 0.3 to 0.5 depending on the engine).

In the case that the diesel engine 100 is for the working machine, the engine load and the engine speed are violently changed, and a stable region as shown in FIG. 6 is limited to the warm-up just after starting the engine in many cases.

Since the temperature of each of the parts is low during the warm-up, and the heat dissipation amount of the EGR gas is increased, the EGR gas temperature becomes low. Taking the influence into consideration in the equation (4), it is possible to accurately judge the EGR gas amount even during the warm-up.

Assuming that the compensated mixed gas temperature Tmr on the map and the actually measure downstream temperature $T_2$ necessarily deviate, in the cooling condition, the compensated mixed gas temperature Tmr is calculated by employing the equation (4) without employing the equation (1).

The temperature of the exhaust gas is uniquely defined on the basis of the engine load and the engine speed. However, if the temperature of the path in the middle of the exhaust gas (the EGR gas) flow is low, the heat is absorbed by the path member, and the temperature of the EGR gas is lowered. In the case of setting the opening degree of the EGR valve 5 on the basis of the lowered EGR gas temperature, it is impossible to execute an accurate judgment.

Therefore, in accordance with the seventh aspect of the present invention, whether or not the warm-up is executed is judged by monitoring the way of increasing the cooling water temperature. If the temperature of the path member absorbing the heat of the exhaust gas (the EGR gas) is increased, the cooling water temperature is also increased. For example, it is possible to approximately estimate whether the EGR gas which is originally 300° C. is lowered to 250° C. or lowered to 200° C. Reflecting it on the equation (4) and arithmetically operating by the judging device 13, it is possible to appropriately compensate the compensated mixed gas temperature Tmr.

INDUSTRIAL APPLICABILITY

The exhaust gas recirculation control device in accordance with the present invention can be applied to various diesel engines.

What is claimed is:

1. An exhaust gas recirculation control device in a diesel engine provided with an exhaust gas recirculation path communicating a suction air path with an exhaust gas path, the device comprising:
    a first temperature sensor provided at a portion more on the upstream side than a portion where said suction air path joins the exhaust gas recirculation path;
    a second temperature sensor provided at a portion more on the downstream side than a portion where said suction air path joins the exhaust gas recirculation path;
    an engine load detection sensor;
    an engine speed detection sensor;
    memory means storing, in advance, a temperature of a suction air before being mixed with an exhaust gas, and a temperature value at said second temperature sensor installation position corresponding to an appropriate exhaust gas recirculation amount which is uniquely defined by an engine load and an engine speed; and
    judging means comparing the temperature value stored in said memory means corresponding to the detected values detected from said engine load detection sensor, the engine speed detection sensor and the first temperature sensor, with the detection value detected by said second temperature sensor, determining that the recirculation exhaust gas amount is appropriate in the case that said detection value is within a predetermined range relative to said temperature value, and determining that the recirculation exhaust gas amount is abnormal in the case that said detection value is not within the predetermined range relative to said temperature value.

2. An exhaust gas recirculation control device in a diesel engine according to claim 1, wherein
    in the diesel engine in which an operation of rapidly changing an engine load or an engine speed is executed, said judging means executes a judgment of the amount of the recirculation exhaust gas only at a time when the engine load and the engine speed are stabilized.

3. An exhaust gas recirculation control device in a diesel engine according to claim 1, wherein a cooling water temperature sensor detecting a temperature of a cooling water is provided, a detecting means detecting that a warm-up is finished on the basis of a fact that the temperature of the cooling water detected by said cooling water temperature sensor detects reaches a predetermined temperature is provided, and the judgment of the amount of the recirculation exhaust gas is executed by said judging means at either a time after the warm-up is finished and before an actual operation is started, or a time after the actual operation is finished and the engine stops.

4. An exhaust gas recirculation control device in a diesel engine according to claim 1, wherein when the judging means determines that the amount of the recirculation exhaust gas is abnormal in the case that the detection value does not exist within the predetermined range, by comparing the temperature value stored in said memory means corresponding to the detection value detected from said engine load detection sensor, the engine speed detection sensor and the first temperature sensor with the detection value detected by said second temperature sensor, a margin in said predetermined range is set smaller in a side in which the detection value of the second temperature sensor is higher than in a side in which the detection value is lower.

5. An exhaust gas recirculation control device in a diesel engine according to claim 1, wherein a compensating means for compensating the temperature value stored in said memory means by the temperature value detected by said cooling water temperature sensor at a time of a cooling condition is provided.

6. An exhaust gas recirculation control device in a diesel engine according to claim 1, wherein a response delay of the detection value by said second temperature sensor is compensated by averaging the temperature value stored in said memory means corresponding to the detection values detected from said engine load detection sensor in a temporal manner, the engine speed detection sensor and the first temperature sensor.

7. An exhaust gas recirculation control device in a diesel engine according to claim 6, wherein a compensating means for compensating the temperature value stored in said memory means by the temperature value detected by said cooling water temperature sensor at a time of a cooling condition is provided.

8. An exhaust gas recirculation control device in a diesel engine according to claim 1, wherein a throttle valve capable of regulating a flow rate of the exhaust gas passing through said exhaust gas recirculation path is provided in the exhaust gas recirculation path, a control means for controlling an opening degree of said throttle valve is provided, and an opening degree of the throttle valve is controlled by said control means, whereby the temperature value at the portion more on the downstream side than the portion where the suction air path communicates with said exhaust gas recirculation path corresponding to the temperature value at the portion more on the upstream side than the portion where the suction air path communicates with said exhaust gas recirculation path is within a previously set predetermined range.

9. An exhaust gas recirculation control device in a diesel engine according to claim 8, wherein a response delay of the detection value by said second temperature sensor is compensated by averaging the temperature value stored in said memory means corresponding to the detection values detected from said engine load detection sensor in a temporal manner, the engine speed detection sensor and the first temperature sensor.

10. An exhaust gas recirculation control device in a diesel engine according to claim 8, wherein in the diesel engine in which an operation of rapidly changing an engine load or an engine speed is executed, said judging means executes a judgment of the amount of the recirculation exhaust gas only at a time when the engine load and the engine speed are stabilized.

11. An exhaust gas recirculation control device in a diesel engine according to claim 8, wherein a cooling water temperature sensor detecting a temperature of a cooling water is provided, a detecting means detecting that a warm-up is finished on the basis of a fact that the temperature of the cooling water detected by said cooling water temperature sensor detects reaches a predetermined temperature is provided, and the judgment of the amount of the recirculation exhaust gas is executed by said judging means at either a time after the warm-up is finished and before an actual operation is started, or a time after the actual operation is finished and the engine stops.

12. An exhaust gas recirculation control device in a diesel engine according to claim 8, wherein a compensating means for compensating the temperature value stored in said memory means by the temperature value detected by said cooling water temperature sensor at a time of a cooling condition is provided.

* * * * *